United States Patent
Ricketts (10) Patent No.: US 8,596,396 B1
(45) Date of Patent: Dec. 3, 2013

(54) AIR INTAKE CONFIGURATION FOR AN AGRICULTURAL HARVESTING MACHINE

(75) Inventor: Jonathan Eugene Ricketts, Coal Valley, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/586,279

(22) Filed: Aug. 15, 2012

(51) Int. Cl.
  *F01P 7/02* (2006.01)
(52) U.S. Cl.
  USPC ............ 180/68.1; 55/328; 55/283; 55/294; 55/301; 55/385.3; 55/467; 96/421; 123/41.11; 123/41.49
(58) Field of Classification Search
  None
  See application file for complete search history.

(56) References Cited

U.S. PATENT DOCUMENTS

| | | | |
|---|---|---|---|
| 2,730,084 A | 1/1956 | Stegeman | |
| 2,886,016 A | 5/1959 | Ashton | |
| 3,987,862 A | 10/1976 | Lidstone | |
| 4,373,940 A * | 2/1983 | Petersen | 55/328 |
| 4,514,201 A | 4/1985 | Brown | |
| 4,874,411 A | 10/1989 | Snauwaert et al. | |
| 7,370,575 B2 | 5/2008 | Kraus et al. | |
| 7,507,270 B2 * | 3/2009 | Maas et al. | 55/385.3 |
| 2010/0012413 A1 | 1/2010 | Chaney et al. | |
| 2010/0267432 A1 * | 10/2010 | Roberge et al. | 460/59 |

FOREIGN PATENT DOCUMENTS

CN  201687615  12/2010

\* cited by examiner

*Primary Examiner* — John R Olszewski
*Assistant Examiner* — Hilary L Johns
(74) *Attorney, Agent, or Firm* — Patrick M. Sheldrake (57) ABSTRACT

An agricultural work vehicle includes an enclosed engine compartment within the vehicle body, with the engine compartment having a top cover that extends generally between opposite sides of the vehicle body. A vertically oriented air inlet is defined in the vehicle body for intake of air into the engine compartment. An intake housing is configured over the air inlet and includes an inlet opening and an outlet opening in communication with the engine compartment air inlet. The inlet opening extends above the top cover and is oriented relative to a vertical plane such that an angled air flow path is defined between the inlet opening and the outlet opening wherein air is drawn from an area above the top cover of the engine compartment and is directed into the air inlet.

18 Claims, 6 Drawing Sheets

AIR INTAKE CONFIGURATION FOR AN AGRICULTURAL HARVESTING MACHINE

FIELD OF THE INVENTION

The present invention generally relates to agricultural harvesting machines, such as a combine, and more particularly to a cooling and engine air intake system for such vehicles.

BACKGROUND OF THE INVENTION

Agricultural work vehicles, such as a harvester combine, are typically powered by an internal combustion engine located in an engine compartment, which isolates the engine from the relatively dirty work environment. The internal combustion engine requires a relatively clean source of engine combustion air and cooling air that must be drawn from ambient air around the vehicle. The harvesting process, however, generates a significant amount of airborne particulates, including dust, dirt, and the like. MOG (material other than grain) is separated from the harvested grain and is typically blown out from the processing equipment and spread on the ground behind the vehicle as chaff. This process of spreading chaff is possibly the major contributor to the relatively dirty ambient air around the vehicle. With the unavoidable amount of airborne matter in the ambient air, it can be difficult to draw and supply the clean air needed by the engine.

Conventional combines draw ambient air from generally along the side of the vehicle with an engine fan. The air is drawn through a rotary air screen that provides an initial degree of cleaning. A vacuum system may be configured with the rotary screen to vacuum particulate matter from the screen as it rotates. A portion of the air drawn through the rotary screen is directed through heat exchangers (e.g., radiator, charge air cooler, hydraulic system cooler, and so forth), while another portion is further cleansed in an engine air filter and directed to the engine intake manifold for combustion air. Because the air is initially drawn from perhaps the dirtiest air around the vehicle, the rotary screen and engine air filter require frequent cleaning and maintenance.

U.S. Pat. No. 7,507,270 proposes an arrangement wherein an air scoop is placed around the rotary screen. The air scoop has an upwardly facing inlet above the combine body and engine housing to draw relatively cleaner air through the rotary screen as compared to the air drawn from alongside the vehicle.

Accordingly, what is sought in the industry is an improved air intake configuration that will initially supply relatively cleaner air for engine combustion and component cooling as compared to conventional designs.

BRIEF DESCRIPTION OF THE INVENTION

Aspects and advantages of the invention will be set forth in part in the following description, or may be obvious from the description, or may be learned through practice of the invention.

In general, aspects of the present invention relate to a work vehicle, particularly agricultural work vehicles such as a harvester combine. It should be appreciated, however, that the invention is not limited to a combine, or any other particular type of work vehicle, and that the invention has usefulness for any vehicle wherein it is beneficial to provide a relatively clean source of engine compression and cooling air. Aspects of the invention are described herein with reference to a combine for illustrative purposes only.

In certain embodiments, the agricultural work vehicle includes a vehicle body, with an enclosed engine compartment configured within the vehicle body. The engine compartment has a top cover that extends in a direction between opposite sides of the vehicle body. The top cover need not extend completely between the opposite sides. A vertically oriented air inlet is provided in the vehicle body for intake of air into the engine compartment. This intake may be equipped with a filtering or screening device, such as a rotary screen and associated vacuum device. An air intake housing is configured over the air inlet and has an inlet opening and an outlet opening in communication with the air inlet. The intake housing is configured such that the inlet opening extends above the top cover and is oriented relative to a vertical plane such that an angled air flow path is defined between the inlet opening and outlet opening wherein air is drawn primarily from an area above the top cover and is directed into the air inlet. The area above the top cover of the engine compartment is, for many types of agricultural work vehicles, relatively cleaner than the dirtier ambient air that surrounds the work vehicle. The intake housing takes advantage of this source of relatively cleaner air.

In a particular embodiment, the intake housing is mounted to the vehicle body over the air inlet and defines a generally right-angle bend between the inlet opening and the outlet opening such that the air is drawn substantially in a direction across the top cover into the inlet opening. It should be appreciated that the degree of bend in the flow path may vary, so long as the majority of the intake air is drawn primarily from the area over the top cover as opposed, for example, to an area outside of the protective envelope of the top cover, and then directed generally vertically to the air inlet in the side of the vehicle body.

The orientation of the inlet opening to the intake housing may vary. In a particular embodiment, the inlet opening is oriented substantially parallel to a side of the top cover such that the air is drawn substantially in a direction from an opposite side of the top cover. In an alternate embodiment, the inlet opening is oriented at one of a rearwardly or forwardly facing angle relative to a side of the top cover such that the air is also drawn from a rearwardly or forwardly direction across the top cover.

The width of the inlet opening may also vary. In a particular embodiment, the inlet opening has a width so as to extend essentially across the length dimension of the top cover. In an alternate embodiment, the width of the inlet opening may be substantially less. For example, the intake housing may taper between the right-angle bend and the inlet opening.

The shape of the intake housing may vary widely within the scope and spirit of the invention. For example, the housing may, in certain embodiments, have a generally rounded cross-sectional shape, such as a semi-spherical or semi-cylindrical shape, and is mounted over the air inlet with a portion that extends above the top cover and defines a generally vertically oriented inlet opening. The intake housing may, in this embodiment, be a shell member that is mounted to the vehicle sides over the air inlet. With this embodiment, the inlet opening would be disposed adjacent to the top cover without extending over the top cover, but still be oriented so as to drawn air from primarily the space over the top cover.

In an alternate embodiment, the intake housing may include a top portion that extends in a generally horizontal direction over the top cover, with the inlet opening defined by this top portion. The top portion may include a bottom wall or panel that is spaced from said top cover, or the top portion may be attached to the top cover. With this embodiment, the inlet opening is actually disposed over the top cover.

In yet a further unique embodiment, the work vehicle may be equipped with a grain bin extension skirt forward of the engine compartment. With many conventional combine designs, this extension skirt extends at an angle above and over the top cover of the engine compartment so as to create a protected eave area over a forward portion of the top cover. The intake housing may be designed to take advantage of this protected area. For example, the intake housing may include a top extension portion that extends into the eave area, with the inlet opening defined by the extension portion such that air is drawn primarily from the protected eave area into the inlet opening. The inlet opening may be disposed adjacent the top cover or over the top cover in the eave area, and may be oriented to draw air from any direction, such as in a forward direction across the top cover and towards the eave area. The extension portion may be any manner of pipe, conduit, or other suitable air-conducting member.

The present invention also encompasses various method embodiments for supplying engine combustion and cooling air to an internal combustion engine of a work vehicle, wherein the engine is housed in an engine compartment having a top cover that extends between sides of the vehicle body and an air inlet is provided in the vehicle body for intake of air into the engine compartment. A method embodiment may include configuring an intake housing over the air inlet and using the housing to draw air into the intake housing from an area primarily above the top cover, wherein the air from this relatively protected area is supplied to the air inlet.

In a particular method embodiment, the air is drawn into the intake housing through a generally right-angle bend such that the air is drawn substantially in a direction across the top cover into an inlet opening in the intake housing. The inlet opening may be oriented at an angle relative to a side of the top cover such that the air is also drawn from a forward and/or rearward direction across the top cover.

A particular method embodiment may include drawing the intake air into the intake housing from a protected eave area defined by a grain bin extension skirt mounted on the vehicle body that extends at an angle above and over the top cover so as to create the eave area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
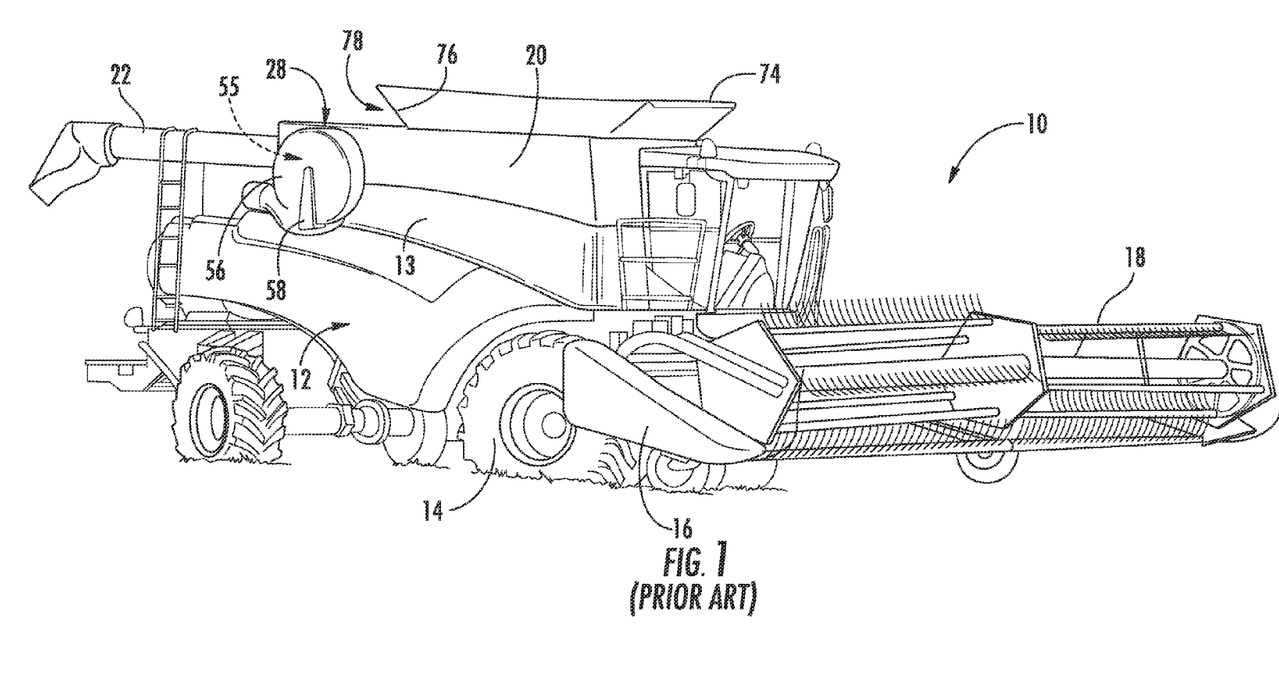
FIG. 1 is a perspective view of a conventional combine harvester.

Referring now to the drawings, wherein like numbers refer to generally like items or features, FIG. 1 depicts an agricultural work vehicle 10 as a conventional combine harvester having a body 12 with sides 13 mounted on a frame (not visible). The body 12 and frame are supported on wheels 14 or other transport means, such as tracks. A feeder house 16 is configured on a front end of the combine 10 with a header 18 that serves to sever a swath of crops from a field as the combine 10 moves forward and to convey the severed crops to feeder house 14. The feeder house 16 includes an internal conveying system (not shown), for conveying the crops upwardly and rearwardly into the body of the combine 10 and into an inlet of an internal separating or threshing system for processing. The threshing system generally includes a rotor at least partially enclosed in a concave structure in which the crop material is processed for separating grain and material other than grain (MOG) from straw, with the straw being ejected rearwardly from the threshing system through the rear end of the combine 10 for deposit on the field, as is well-known. The harvested crop material is conveyed to a grain bin 20 for subsequent unloading via an unload auger 22. An upwardly extending grain bin extension skirt 74 may be configured above the grain bin 20.

Figure 2:
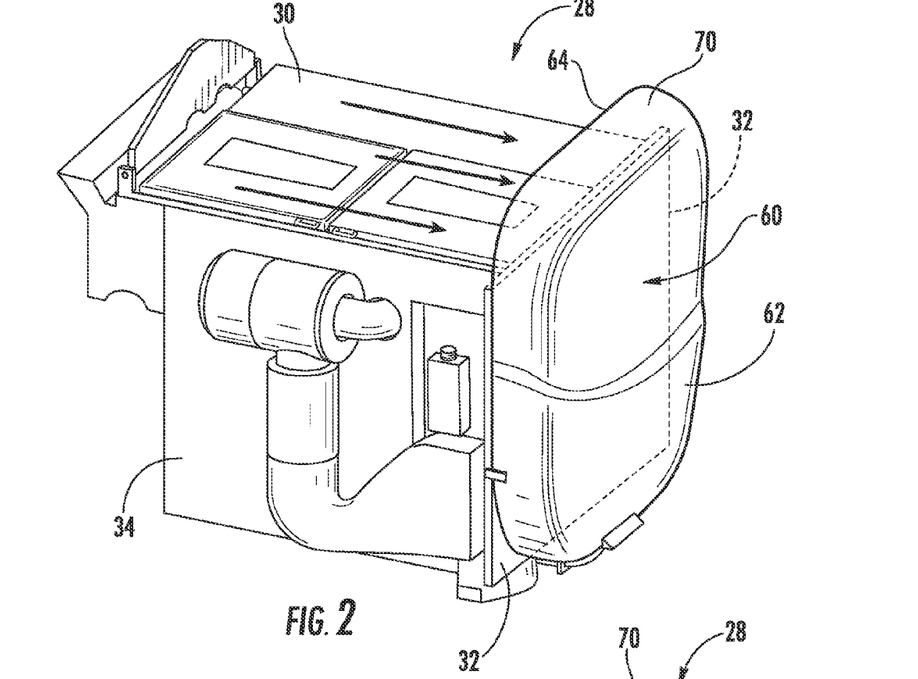
FIG. 2 is a perspective view of an engine compartment incorporating an embodiment of an air intake system in accordance with aspects of the invention.
Figure 3:
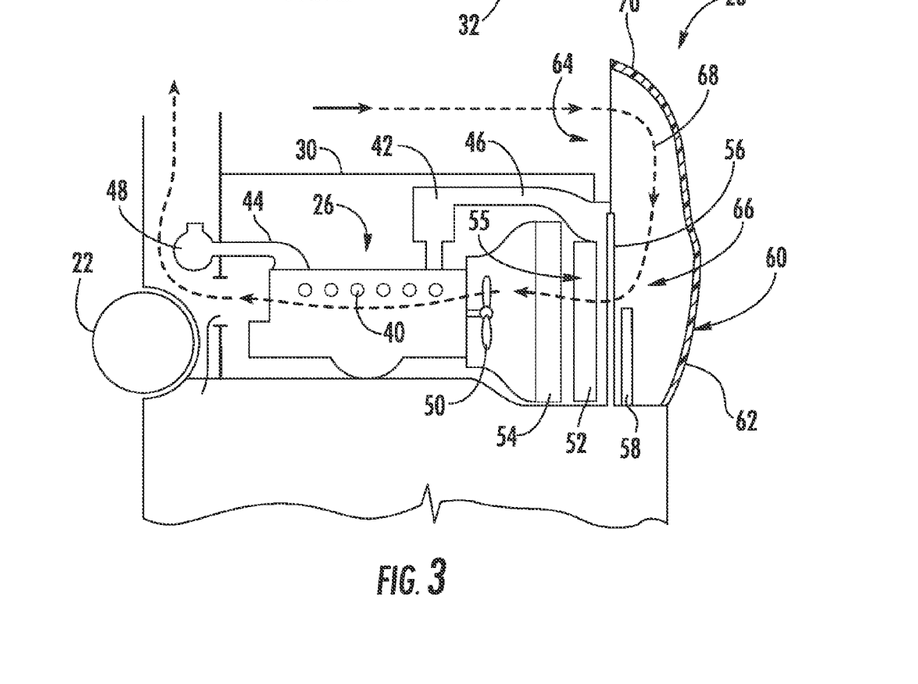
FIG. 3 is a cross-sectional view of an embodiment of an engine compartment with an air intake system similar to the embodiment of FIG. 2.

Referring to FIGS. 1 through 3, the combine 10 includes an internal combustion engine 26 housed within engine compartment 28 in the rear portion of the combine. The engine compartment 28 may be variously configured. In the illustrated embodiment, the compartment 28 is defined by a housing structure having panels mounted to the vehicle frame, including top cover panel 30, side panels 32, and rear panel 29. In an alternate embodiment, the engine compartment may be manufactured with the engine 28 and mounted as an integral unit in the vehicle 10.

Internal combustion engines 26 are well known and need not be described in detail herein. Briefly, the engine 26 includes combustion cylinders 40 operably configured between an intake manifold 42 and an exhaust manifold 44. The intake manifold 42 receives combustion air via duct 46 in communication with an air inlet in the body 12, particularly in the body side 13. A turbocharger system may be utilized for providing compressed charge air to combustion cylinders 40. Exhaust gas is discharged from the cylinders 40 to muffler 48 via exhaust manifold 44.

A fan 50 within the engine compartment 28 draws cooling ambient air through a radiator 52 and charge air cooler 54. Radiator 52 cools the liquid coolant circulated within the engine 26, and the charge air cooler 54 cools the compressed and heated air which is discharged from the turbocharger. A rotary screen 56 is configured in the vehicle side 30 at the upstream side of radiator 52 and charge air cooler 54. This screen 56 rotates during operation of the combine 10 to remove airborne particulates (e.g., chaff, straw, and the like) from the ambient air drawn through the radiator 52. A vacuum 58 vacuums the particulate matter from the outer surface of rotary screen 56 as the screen rotates past the vacuum.

FIGS. 2 and 3 illustrate an embodiment of an engine compartment 28 that includes an intake housing 60 configured over the air inlet 55 (FIG. 1) in the vehicle body 12. In particular, the housing 60 has an overall shape and depth so as to be mounted to the vehicle side 13 over the rotary screen 56 and vacuum device 58. In this regard, it should be appreciated that the intake housing 60 may have various shapes, and that the generally rectangular shell shape depicted in the figures is for illustrative purposes only. The housing 60 may, in other embodiments, have a semi-spherical shape, cylindrical or oval shape, or any other suitable shape. The intake housing 60 may be defined by separate components that are attached together to define the housing 60, or may be a single panel member 62 that is formed by any suitable molding or forming process into the overall desired shape of the intake housing 60.

Still referring to FIGS. 2 and 3, the intake housing 60 has an inlet opening 64 that extends above the top cover 30 of the engine compartment 28. The inlet opening 62 is oriented relative to a vertical plane (e.g., the vertical plane of the engine compartment side 32) such that an angled air flow path 68 is defined between the inlet opening 64 and an outlet opening 66 of the intake housing 60. The outlet opening 66 is positioned generally adjacent to the rotary screen 56 such that air drawn into the housing 60 is then drawn through the rotary screen 56 and through the engine compartment components discussed above. Referring particularly to FIG. 3, it should thus be appreciated that the orientation and position of the intake housing 60 relative to the top cover 30 of the engine compartment allows the substantial portion of the engine intake air to be drawn from the relatively protected area above the engine compartment 28. As indicated by the air flow path 68 in FIG. 3, this flow path may, in certain embodiments, define a generally right-angle bend between the inlet opening 64 and the vertical path to the outlet opening 66 such that the air is drawn in a substantially horizontal direction across the top cover 30 into the inlet opening 64. It should be appreciated that the "right-angle bend" may be variously defined, with the intent being to drawn the substantial portion of the engine intake air from the area above the engine compartment into the inlet opening through the rotary screen 56. This flow path is dictated by the shape and configuration of the intake housing 60, and may include any manner of internal structure or baffle to direct the air flow as desired.

In particular embodiments as depicted in FIGS. 2 and 3, the inlet opening 64 of the air intake housing 60 is oriented substantially parallel to a side of the top cover 30 corresponding essentially to the engine compartment side panel 32. With this configuration, the air is drawn in a direction substantially from the opposite side of the top cover, as particularly depicted in FIG. 2.

It should be appreciated that the inlet opening 64 into the housing 60 may have various shapes and dimensions. In the embodiment depicted in FIGS. 2 and 3, the inlet opening 64 has a width so as to extend generally across the length dimension (front to back of the vehicle) of the top cover 30. This embodiment may be desired to maximize the intake of air from the area above the entire surface area of the top cover 30. In other embodiments, the inlet opening 64 may be defined by a top portion 70 of the intake housing 60 that tapers in a direction towards the opposite side of the engine compartment 28.

In the embodiment of FIGS. 2 and 3, the intake housing 60 has a generally rounded cross-sectional shape and includes the top portion 70 that extends above the side panel 38 of the engine compartment without extending over the top cover 30. The top portion 70 defines a generally vertically oriented inlet opening 64 that faces the opposite side of the engine compartment 28, as particularly illustrated in FIG. 3.

Figure 4:
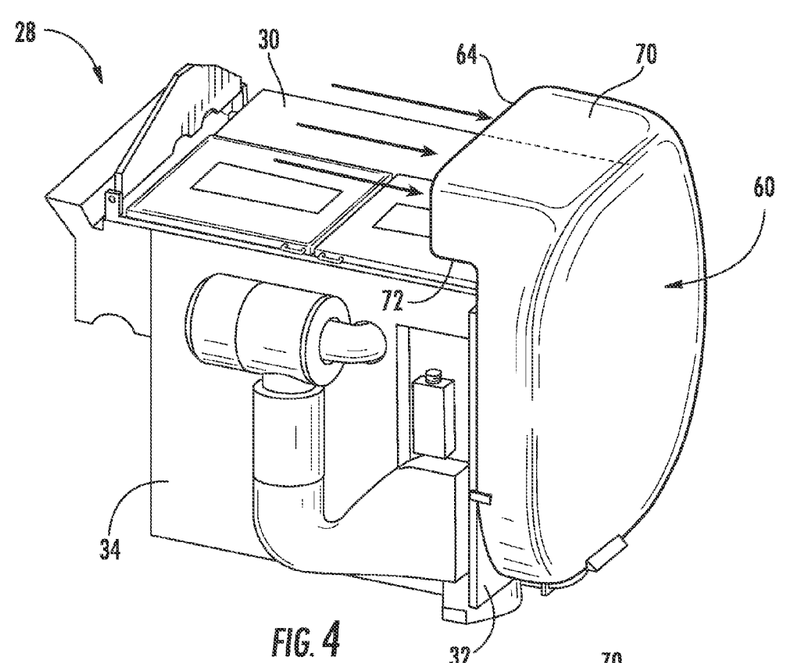
FIG. 4 is a perspective view of an engine compartment incorporating another embodiment of an air intake system in accordance with aspects of the invention.
Figure 5:
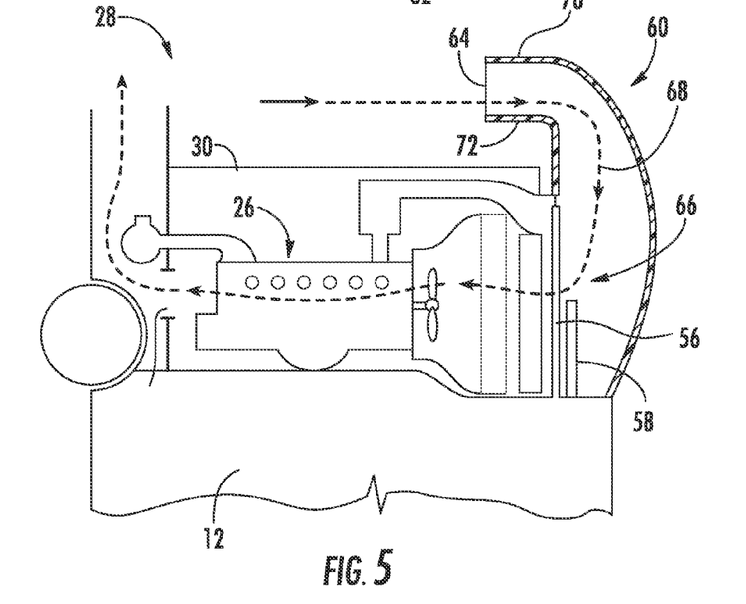
FIG. 5 is a cross-sectional view of an embodiment of an engine compartment with an air intake system similar to the embodiment of FIG. 4.

In the embodiment depicted in FIGS. 4 and 5, the top portion 70 of the air intake housing 60 extends over the top cover 30 of the engine compartment 28 such that the inlet opening 64 is disposed over the top cover 30, as particularly illustrated in FIG. 5. In this particular embodiment, the top portion 70 includes a bottom panel 72, wherein the top portion 70 defines an essentially duct-like member that draws the air from an area above the surface of the top cover 30, as generally depicted by the arrow in FIG. 5. This embodiment may be desired to minimize the amount of relatively hot air adjacent to the top cover 30 that is drawn into the intake housing 60, appreciating that a certain amount of this air will inevitably be drawn in as well.

Figure 6:
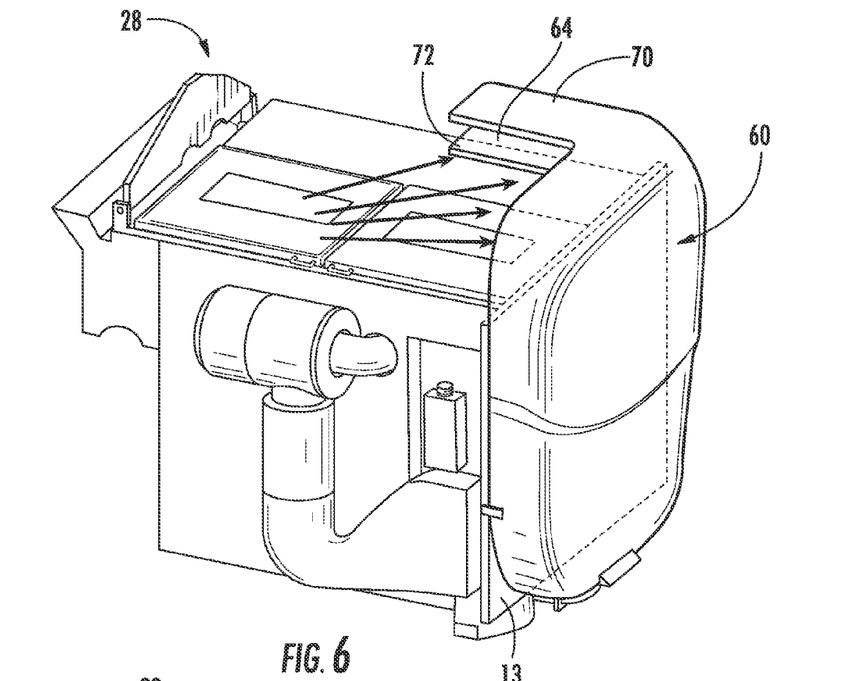
FIG. 6 is a perspective view of an engine compartment incorporating still another embodiment of an air intake system in accordance with aspects of the invention.
Figure 7:
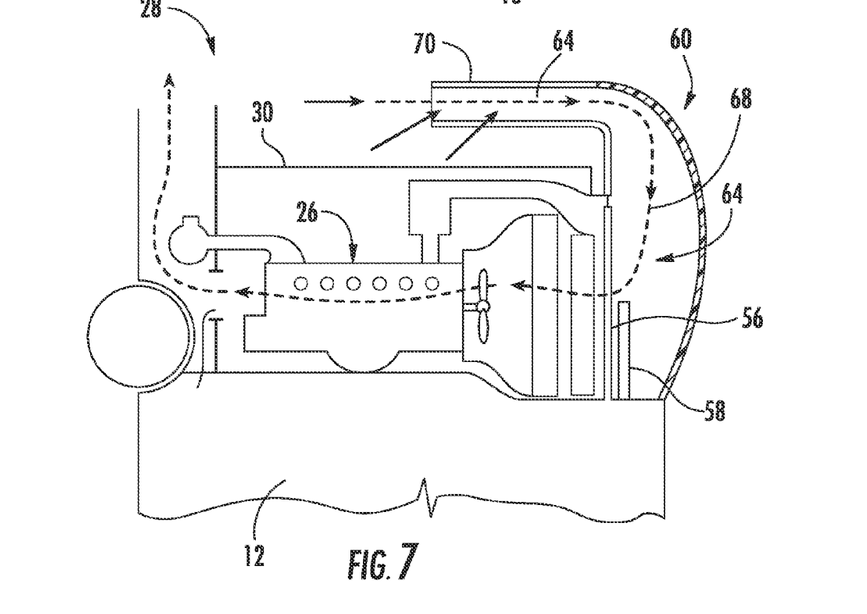
FIG. 7 is a cross-sectional view of an embodiment of an engine compartment with an air intake system similar to the embodiment of FIG. 7.

In the embodiment depicted in FIGS. 6 and 7, the air intake housing 60 includes a top portion 70 that defines an inlet opening 64 oriented at one of a rearwardly or forwardly facing angle relative to a side of the top cover. With this embodiment, as depicted in FIG. 6, air is drawn from a rearwardly or forwardly direction across the top cover and into the air intake housing 60. In the embodiment depicted in FIGS. 6 and 7, the inlet 64 is defined by a section of the top portion 70 that faces rearwardly, as well as an open side of the top portion 70 that faces the opposite side of the engine compartment 28.

It should be appreciated from the various embodiments described herein that any manner and configuration of air intake housing 60 and inlet opening 64 may be designed to draw the air from any desired location from the relatively protected space above the engine compartment 28, and that the invention is not limited to any particular shape, number, and orientation of such inlet openings 64.

Figure 8:
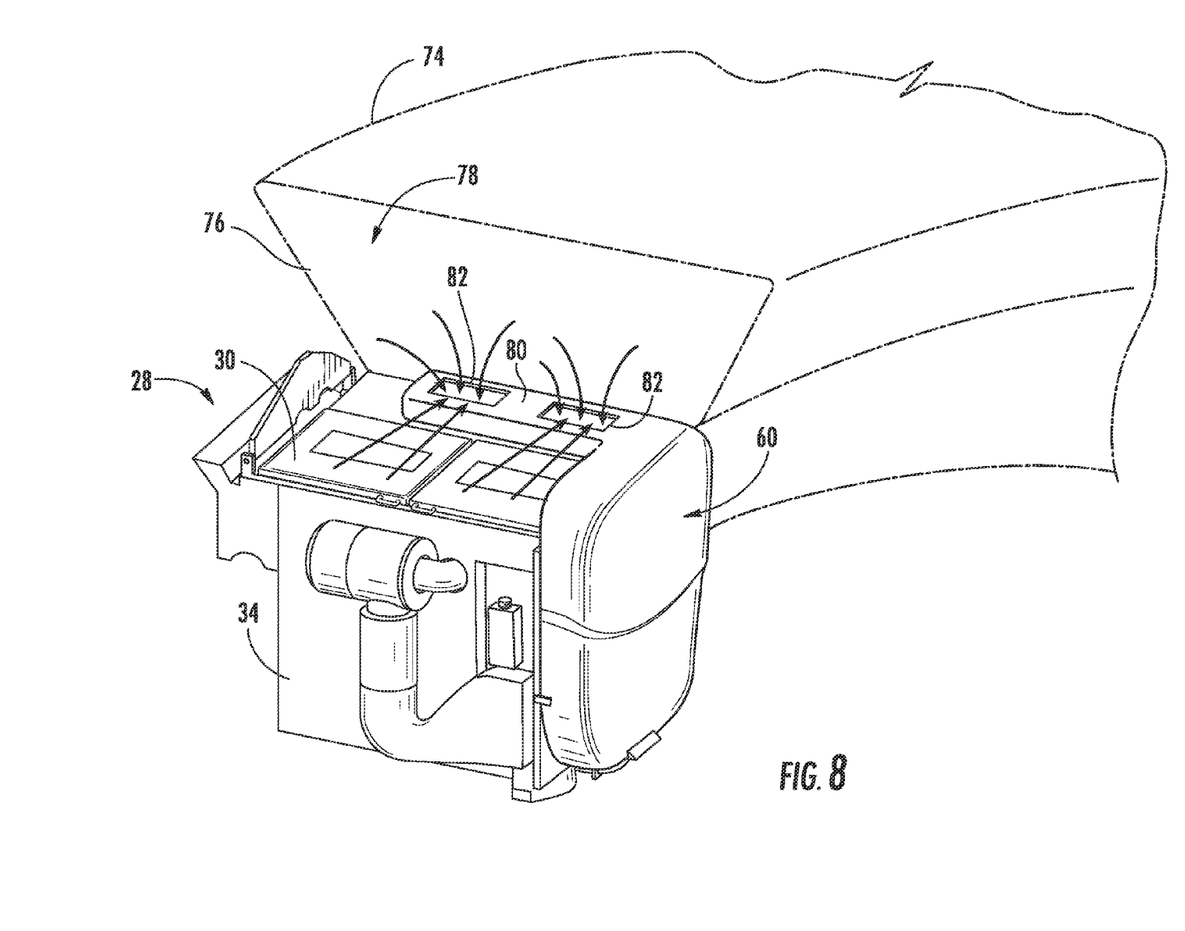
FIG. 8 is a perspective view of an engine compartment incorporating an embodiment of an air intake system to draw engine air from a protected eave area defined by the overhang of a grain bin extension skirt relative to the engine compartment.
Figure 9:
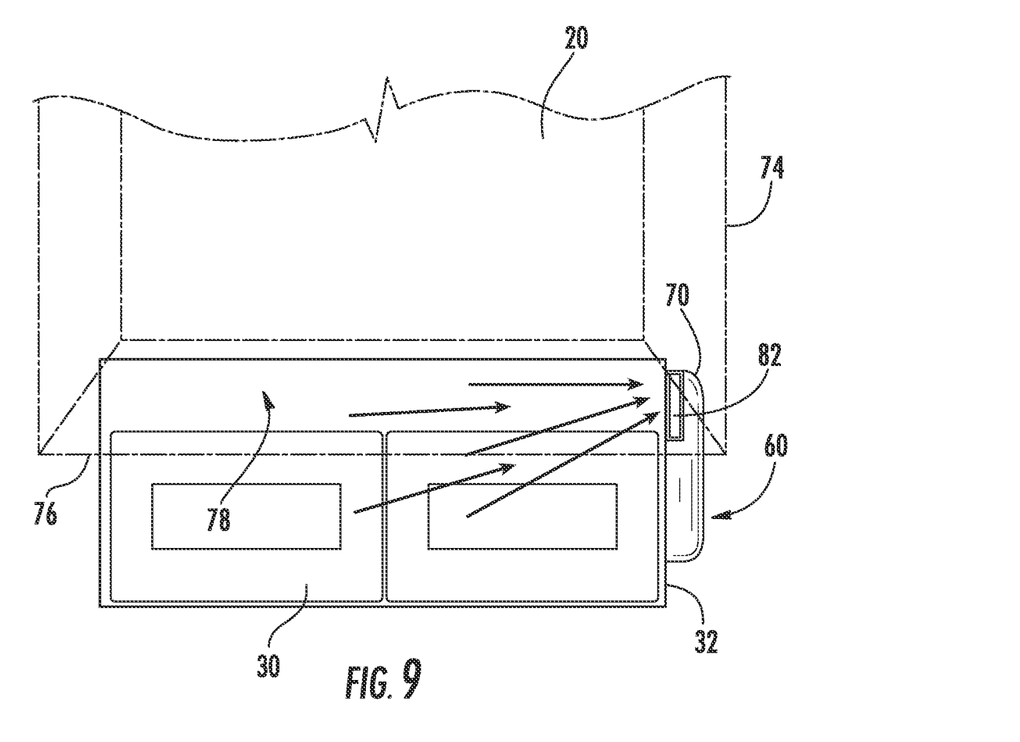
FIG. 9 is a top view of another embodiment of an air intake system that draws air from the eave area similar to the embodiment of FIG. 8.

The embodiment of FIGS. 8 and 9 take advantage of the relatively protected space in an eave area 78 above the engine compartment 28 where a rear portion 76 of a grain bin extension skirt 74 overhangs the engine compartment 28, as can be readily appreciated from FIGS. 1, 8, and 9. In this particular embodiment, the air intake housing 60 includes a top extension portion 80 that is positioned within this eave area 78, generally adjacent to the rear portion 76 of the bin extension skirt 74. Any number and orientation of inlet openings 82 are defined in this extension portion 80 in order to draw the air in from the eave area 78, as generally depicted in FIG. 8.

In the embodiment of FIG. 9, the air intake housing 60 does not include a portion that extends over the top cover 30, but has an inlet opening 82 positioned alongside the side panel 32 within the protected eave area 78 such that air is drawn into the air intake housing 60 from the eave area 78, as well as from other areas over the top cover 30.

It should be appreciated that the present invention also encompasses various methodologies for supplying engine combustion and cooling air to internal combustion engine 26 of an agricultural work vehicle 10 in accordance with aspects discussed above. For example, in a particular embodiment, the method includes configuring an intake housing 60 over the air inlet 55 of an engine compartment and drawing air into the intake housing 60 from an area above the top cover 30 of the engine compartment. In one embodiment, the method includes drawing air into the intake housing 60 through a generally right-angle bend such that the air is drawn substantially in a horizontal direction across the top cover into the inlet opening in the intake housing 60, wherein the air is then directed vertically to the outlet opening in the intake housing 60.

Other method embodiments may include orienting the inlet opening 64 of the intake housing at an angle relative to a side of the top cover 30 such that the air is also drawn from a forwardly or rearwardly direction across the top cover.

Still other method embodiments may include drawing the engine air from the relatively protected eave area 78 defined by the overhang of a grain bin extension skirt 74 relative to the top cover 30 of the engine compartment, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural work vehicle, comprising:
    a vehicle body;
    an enclosed engine compartment within said vehicle body, said engine compartment having a top cover that extends between opposite sides of said vehicle body;
    a vertically oriented air inlet in said vehicle body for intake of air into said engine compartment;
    an intake housing configured over said air inlet, said intake housing having an inlet opening and an outlet opening in communication with said air inlet;
    said inlet opening extending above said top cover and oriented relative to a vertical plane such that an angled air flow path is defined between said inlet opening and said outlet opening wherein air is drawn from an area above said top cover and directed into said air inlet; and
    wherein said intake housing is mounted over said air inlet and has a bend between said inlet opening and said outlet opening such that the air is drawn substantially in a direction across said top cover from an opposite side of said top cover from an area above a portion of the vehicle body into said inlet opening.

2. The agricultural work vehicle as in claim 1, wherein said intake housing is mounted to a side of said vehicle body over said air inlet and defines a generally right-angle bend between said inlet opening and said outlet opening such that the air is drawn substantially in a direction across said top cover into said inlet opening generally perpendicular to an intended direction of travel of the vehicle.

3. The agricultural work vehicle as in claim 1, wherein said inlet opening is oriented in a direction generally opposite the air inlet of the vehicle body.

4. The agricultural work vehicle as in claim 1, wherein said inlet opening has a width so as to extend essentially across a length dimension of said top cover.

5. An agricultural work vehicle, comprising:
    a vehicle body;
    an enclosed engine compartment within said vehicle body said engine compartment having a top cover that extends between opposite sides of said vehicle body;
    a vertically oriented air inlet in said vehicle body for intake of air into said engine compartment;
    an intake housing configured over said air inlet, said intake housing having an inlet opening and an outlet opening in communication with said air inlet; and
    said inlet opening extending above said top cover and oriented relative to a vertical plane such that an angled air flow path is defined between said inlet opening and said outlet opening wherein air is drawn from an area above said top cover and directed into said air inlet;
    wherein said inlet opening is oriented at one of a rearwardly or forwardly facing angle relative to a side of said top cover such that the air is also drawn from a rearwardly or forwardly direction across said top cover.

6. The agricultural work vehicle as in claim 1, wherein said intake housing tapers between said right-angle bend and said inlet opening.

7. The agricultural work vehicle as in claim 1, wherein said intake housing comprises a generally rounded cross-sectional shape mounted over said air inlet with a portion extending above said top cover and defining a generally vertically oriented inlet opening.

8. The agricultural work vehicle as in claim 1, wherein said intake housing comprises a top portion that extends over said top cover, said inlet opening defined by said top portion.

9. The agricultural work vehicle as in claim 8, wherein said top portion comprises a bottom panel that is spaced from said top cover.

10. The agricultural work vehicle as in claim 1, wherein said inlet opening is disposed adjacent said top cover without extending over said top cover.

11. An agricultural work vehicle, comprising:
    a vehicle body;
    an enclosed engine compartment within said vehicle body, said engine compartment having a top cover that extends between opposite sides of said vehicle body;
    a vertically oriented air inlet in said vehicle body for intake of air into said engine compartment;
    an intake housing configured over said air inlet, said intake housing having an inlet opening and an outlet opening in communication with said air inlet;
    said inlet opening extending above said top cover and oriented relative to a vertical plane such that an angled air flow path is defined between said inlet opening and said outlet opening wherein air is drawn from an area above said top cover and directed into said air inlet; and
    a grain bin extension skirt mounted on said vehicle body forward of said engine compartment, said extension skirt extending at an angle above and over said top cover so as to create an eave area over a forward portion of said top cover, said intake housing comprising a top extension portion that extends into said eave area, said inlet opening defined by said extension portion such that air is drawn primarily from said eave area into said inlet opening.

12. The agricultural work vehicle as in claim 11, wherein said extension portion is disposed over said top cover under said extension skirt such that said inlet opening is disposed over said top cover.

13. The agricultural work vehicle as in claim 12, wherein said inlet opening is oriented rearwardly across said top cover.

14. The agricultural work vehicle as in claim 11, wherein said extension portion is disposed adjacent said top cover under said extension skirt such that said inlet opening does not extend over said top cover.

15. A method for supplying engine combustion and cooling air to an internal combustion engine of a work vehicle, wherein the engine is housed in an engine compartment having a top cover that extends between sides of a vehicle body, and wherein an air inlet is provided in the vehicle body for intake of air into the engine compartment, the method comprising:
configuring an intake housing over the air inlet and drawing air into the intake housing from an area above the top cover; and
drawing air into the intake housing from above a portion of the vehicle wherein said intake housing is mounted to said vehicle body over said air inlet and has a bend between said inlet opening and said outlet opening such that the air is drawn substantially in a direction across said top cover from an opposite side of said top cover.

16. The method as claimed in claim 15, comprising drawing air into the intake housing wherein said inlet opening is oriented away from the side of the vehicle in a direction generally opposite the air inlet of the vehicle body.

17. A method for supplying engine combustion and cooling air to an internal combustion engine of a work vehicle, wherein the engine is housed in an engine compartment having a top cover that extends between sides of a vehicle body, and wherein an air inlet is provided in the vehicle body for intake of air into the engine compartment, the method comprising:
configuring an intake housing over the air inlet and drawing air into the intake housing from an area above the top cover;
drawing air into the intake housing through a generally right-angle bend such that the air is drawn substantially in a direction across the top cover into an inlet opening in the intake housing; and
orienting the inlet opening at an angle relative to a side of the top cover such that the air is also drawn from a forwardly or rearwardly direction across the top cover.

18. A method for supplying engine combustion and cooling air to an internal combustion engine of a work vehicle, wherein the engine is housed in an engine compartment having a top cover that extends between sides of a vehicle body, and wherein an air inlet is provided in the vehicle body for intake of air into the engine compartment, the method comprising:
configuring an intake housing over the air inlet and drawing air into the intake housing from an area above the top cover,
wherein the work vehicle includes a grain bin extension skirt mounted on the vehicle body forward of the engine compartment, the extension skirt extending at an angle above and over the top cover so as to create an eave area over a forward portion of the top cover, the method comprising orienting the intake housing so as to drawn primarily from the eave area.

* * * * *